(12) United States Patent
Pruitt

(10) Patent No.: US 8,720,513 B2
(45) Date of Patent: May 13, 2014

(54) SIDEWALL FEATURES FOR TIRES

(75) Inventor: Rosa M. Pruitt, Donalds, SC (US)

(73) Assignees: Compagnie Generale des Etablissements Michelin (FR); Michelin Recherche et Technique S.A. (CH)

( * ) Notice: Subject to any disclaimer, the term of this patent is extended or adjusted under 35 U.S.C. 154(b) by 367 days.

(21) Appl. No.: 12/996,934

(22) PCT Filed: Jun. 16, 2008

(86) PCT No.: PCT/US2008/067061
§ 371 (c)(1),
(2), (4) Date: Dec. 8, 2010

(87) PCT Pub. No.: WO2009/154607
PCT Pub. Date: Dec. 23, 2009

(65) Prior Publication Data
US 2011/0094647 A1    Apr. 28, 2011

(51) Int. Cl.
*B60C 13/04* (2006.01)

(52) U.S. Cl.
USPC ........... 152/524; 524/495; 524/445; 524/497; 524/492

(58) Field of Classification Search
USPC .................. 152/524; 524/495, 445, 497, 492
See application file for complete search history.

(56) References Cited

U.S. PATENT DOCUMENTS

| | | | |
|---|---|---|---|
| 4,224,196 A | | 9/1980 | Gursky |
| 5,376,438 A | | 12/1994 | Costemalle et al. |
| 5,988,248 A | * | 11/1999 | Sandstrom .................... 152/524 |
| 2005/0004297 A1 | | 1/2005 | Durel et al. |
| 2005/0250894 A1 | | 11/2005 | Null |
| 2006/0135671 A1 | * | 6/2006 | Zhao et al. .................... 524/445 |
| 2009/0115108 A1 | * | 5/2009 | Rodgers et al. .......... 264/331.15 |

FOREIGN PATENT DOCUMENTS

WO      92/03302 A1    3/1992

OTHER PUBLICATIONS

International Search Report and Written Opinion for PCT/US08/67061 dated Sep. 11, 2008.

* cited by examiner

Primary Examiner — Robert D. Harlan
(74) Attorney, Agent, or Firm — Frank J. Campigotto

(57) ABSTRACT

A tire having a decorative side wall feature, the decorative side wall feature being based upon a rubber composition, the rubber composition comprising between 15 and 25 parts by weight per 100 parts by weight of rubber (phr) of a highly unsaturated diene elastomer, between 60 and 80 phr of a butyl rubber and between 5 and 15 phr of an EPDM elastomer characterized as having an ethylene content of between 65 wt. % and 75 wt. % as measured by ASTM D 3900-95, not including diene, and a Mooney viscosity ML(I+4) at 125° C. of between 60 and 80. The light-colored rubber composition may further include between 5 and 25 phr of a paraffinic processing oil and a non-black filler.

17 Claims, No Drawings

SIDEWALL FEATURES FOR TIRES

BACKGROUND OF THE INVENTION

1. Field of the Invention

This invention relates generally to tire features and more specifically, to the compositions forming decorative sidewall features and raised lettering on tires.

2. Description of the Related Art

Tires conventionally have rubber sidewalls made of rubber compositions reinforced with carbon black that are, therefore, black in color. Sometimes it is desirable to provide decorative features on a portion of the sidewall of a tire, such features made of a white colored or other light-colored rubber composition. These decorative portions include, for example, the white stripe of a whitewall tire and raised white lettering on the sidewalls of the tire. The rubber compositions used to form these decorative portions conventionally contain no carbon black and obtain their white coloring by the addition of titanium dioxide and mineral fillers or, for other light-colored features, other known coloring pigments.

Sidewalls of rubber tires may be subject to aging somewhat prematurely due to various factors which include (1) weathering due to atmospheric conditions such as, for example, exposure to ultraviolet light, ozone and high humidity; (2) fatigue cracking due to continual flexing of the tire sidewall under operating conditions; (3) abrasion due to scuffing against road curbs and other objects. Cracking can particularly be a problem in cold climates where temperatures are well below freezing for long periods of time. The decorative features on the sidewalls of tires are of special concern because, due to their white or other light coloring, blemishes on them may be more cosmetically observable than for black colored sidewalls.

SUMMARY OF THE INVENTION

The present invention includes tires having decorative features made of a light-colored or white rubber composition that is resistant to cracking in very cold climates. The decorative features may include, for example, white sidewalls or raised lettering on the sidewalls of the tire. The decorative features are made at least in part (those parts that are light-colored or white) from the rubber composition disclosed herein.

One embodiment of the present invention includes a tire having a decorative sidewall feature, the decorative sidewall feature being based upon a rubber composition, the rubber composition comprising between 15 and 25 parts by weight per 100 parts by weight of rubber (phr) of a highly unsaturated diene elastomer, between 60 and 80 phr of a butyl rubber and between 5 and 15 phr of an EPDM elastomer characterized as having an ethylene content of between 65 wt. % and 75 wt. % as measured by ASTM D 3900-95, not including diene, and a Mooney viscosity ML(1+4) at 125° C. of between 60 and 80.

The light-colored rubber composition may further include between 5 and 25 phr of a paraffinic processing oil and a non-black filler.

The foregoing and other objects, features and advantages of the invention will be apparent from the following more detailed descriptions of particular embodiments of the invention.

DETAILED DESCRIPTION OF PARTICULAR EMBODIMENTS

Particular embodiments of the present invention include vehicle tires having decorative sidewall features made of white or light-colored rubber composition. Such decorative sidewall features include, for example, a white stripe around the sidewall of a tire (often called a whitewall tire) and raised letters on a tire, the raised letters made at least in part of the white or light-colored rubber composition. The decorative features made of the white or light-colored rubber are particularly useful in areas of extreme cold, where such rubber features are more prone to cracking under stress or flex as a result of the cold conditions.

The decorative features of the tires disclosed herein are based upon a rubber composition having a low dynamic glass transition temperature, Tg, as measured by ASTM D 5992-96. A low dynamic Tg may be characterized as being less than about −28° C. or less than about −30° C. A low dynamic Tg may also be characterized as being between about −28° C. and about −45° C., between about −30° C. and about −40° C. or between about −30° C. and about −38° C. The term "based upon' as used herein recognizes that the decorative rubber features are made of vulcanized or cured rubber compositions that were, at the time of their making, uncured. The cured decorative rubber features are therefore "based upon" the uncured rubber composition that formed the features in their uncured state.

Particular embodiments of the tires having decorative sidewall features based upon the rubber composition include, as the rubber composition, a highly unsaturated diene elastomer, a butyl rubber elastomer, an EPDM elastomer, a paraffinic processing oil and a non-black filler.

Diene elastomers may be categorized as essentially saturated diene elastomers, essentially unsaturated diene elastomers or highly unsaturated diene elastomers. Generally, diene elastomers or rubber is understood to mean those elastomers resulting at least in part (i.e., a homopolymer or a copolymer) from diene monomers (monomers bearing two double carbon-carbon bonds, whether conjugated or not).

Essentially unsaturated diene elastomers are understood to mean those diene elastomers that result at least in part from conjugated diene monomers, having a content of members or units of diene origin (conjugated dienes) that are greater than 15 mol. %. Within the category of essentially unsaturated diene elastomers are the highly unsaturated diene elastomers, which are understood to mean in particular diene elastomers having a content of units of diene origin (conjugated dienes) that is greater than 50 mol. %. Diene elastomers falling outside the preceding definitions are essentially saturated diene elastomers having a low or very low content of units of diene origin, i.e., less that 15 mol. %.

Particular embodiments of the present invention include both highly unsaturated and essentially saturated elastomers. Some embodiments limit the highly unsaturated elastomer to natural rubber only. Other embodiments may limit the highly unsaturated elastomer to synthetic isoprene copolymers or mixtures of such polymers with natural rubber. The synthetic isoprene rubbers include, for example, synthetic cis-1,4 polyisoprenes that may be characterized as possessing cis-1,4 bonds at more than 90 mol. % or alternatively, at more than 98 mol. %.

Embodiments of the present invention limit the amount of highly unsaturated elastomer to between 15 and 25 parts by weight per 100 parts by weight of rubber (phr), between 15 and 22 phr, between 15 and 21 phr, between 15 and 20 phr. between 15 and less than 20 phr or between 15 and less than 18 phr.

The rubber composition disclosed herein includes, in addition to the highly unsaturated elastomers disclosed above, essentially saturated diene elastomers. Examples of such essentially saturated diene elastomers include butyl rubbers as well as copolymers of dienes and of alpha-olefins of the ethylene-propylene diene terpolymer (EPDM) type.

EPDM is the ASTM designation for a terpolymer of ethylene, propylene and a non-conjugated diolefin. In such terpolymers the ethylene and propylene form a fully saturate backbone of methylene linkages with the non-conjugated diolefin, e.g. dicyclopentadiene or ethylidene norbornene (ENB), attached so as to provide unsaturated side chains with readily available crosslinking sites for sulfur curing. The EPDM elastomers thus contain a fully saturated backbone which provides outstanding resistance to oxidation, ozone, and cracking, as well as excellent low temperature flexibility.

Particular embodiments of the rubber composition disclosed herein include an EPDM product having ENB as the diene constituent. The ENB content of the EPDM product is limited to between 0.9 and 6 wt. %, between 2 and 6 wt. % or between 4 and 6 wt. %, such weight percent determined according to ASTM D 6047. Some embodiments of the present invention may limit the EPDM as being a solid at around 23° C. An acceptable EPDM may be characterized as having a Mooney viscosity, as measured according to ASTM 1646, ML (1+4) at 125° C. of between about 50 and 80, between 60 and 80 or between 70 and 80. The ethylene content of the EPDM terpolymers may range between 60 and 75 wt. %, between 65 and 75 wt. % or between 65 and 70 wt. % as measured by ASTM D-3900-95, not including diene.

The amount of EPDM making up the rubber composition may include, for example, between 5 and 15 phr, between 8 and 12 phr or about 10 phr.

Butyl rubbers are known to be copolymers of a small amount of isoprene (typically between 1 to 3% of the monomer feed) with isobutylene. Halogenated butyl rubbers are well known and typically contain between about 1 and 3 wt. % halogen, the halogen typically being chlorine or bromine. Although not meant to be limiting to all embodiments of the invention, particular embodiments of the rubber composition disclosed herein include a butyl rubber having a Mooney viscosity ML (1+8) at 125° C. as determined by ASTM D1646-99 of between 30 and 80, between 40 and 75, between 35 and 55 or between 50 and 52. A suitable chlorobutyl rubber is EXXON CIIR 1068, available from Exxon Mobil.

Particular embodiments of the rubber composition useful for the decorative features may limit the elastomer content to (1) one selected from natural rubber, a synthetic polyisoprene rubber or combinations thereof, (2) one EPDM product as disclosed above and (3) a butyl rubber as disclosed above. In other words, particular embodiments of the present invention do not include mixtures of different types of EPDM products or mixtures of highly unsaturated elastomers other than natural rubber and a synthetic polyisoprene. Of course other particular embodiments are not so limited since the particular embodiments disclosed herein are merely examples of different embodiments of the present invention.

The rubber composition used to form the decorative sidewall features of a tire further includes a paraffinic processing oil. The paraffinic oil is useful for lowering the dynamic glass transition temperature (Tg), which reduces the propensity for cracking of the decorative features in cold climates, such as in the northern United States and in Canada. Extremely cold conditions, such as −40° C. or below, can be reached in some of these areas and very cold conditions can cause some rubber compositions to crack.

Processing oils as used in the rubber industry are typically classified as paraffinic, naphthenic or aromatic process oils and are taken from the crude tower residue through vacuum distillation followed by other processing. While each of these oils include mixtures of paraffinic, naphthenic and aromatic materials, those classified as paraffinic include greater than 60% paraffinic material, those classified as aromatic include greater than 35% aromatic material and those classified as naphthenic include greater than 30% naphthenic material, such content being measured according to ASTM D 2140.

Particular embodiments of the present invention include only the use of paraffinic process oils, excluding the use of naphthenic and aromatic process oils. Useful paraffinic oils may be characterized as having a dynamic glass transition temperature of less than −75° C. or alternatively, between −100° C. and −75° C. or between −90° C. and −75° C. as measured according to ASTM D445. Such oils may further be characterized as having a viscosity of between 5 and 50 cSt at 40° C. An example of a useful paraffinic processing oil is SUNPAR 115, available from Sunoco, Inc.

The amount of paraffinic processing oil that may be added to the rubber composition may be between 5 and 30 phr, between 5 and 25 phr, between 10 and 20 phr or between 15 and 21 phr.

Fillers for the rubber composition suitable for use with the present invention include those that are suitable for whitewall rubber compositions. Therefore, carbon black is not a useful filler in the white-colored rubber composition. Suitable fillers include, for example, high bright clays, silica, talc and/or carbonates. The white color is typically achieved by adding titanium dioxide as a whitening pigment and optionally a blue dye to enhance the white color. A suitable magnesium silicate talc is available as MISTRON VAPOR from Luzenac, America. A suitable high bright clay is available as NUCAP 290 from J. M. Huber, Corporation of New Jersey. High Bright clays are those that have a high reflectance, typically greater than about 85%. NUCAP 290 is a kaolin based product and has a reflectance of 91%.

While the amount of talc and clay can be added in any quantity needed for a particular application, particular embodiments of the present invention include, for example, an amount of talc of between 25 and 100 phr, 25 and 50 phr or between 40 and 50 phr and an amount of high bright clay of between 25 and 100 phr, 25 and 50 phr or between 40 and 45 phr. Likewise, particular embodiments of the present invention include, for example, an amount of titanium oxide of between 25 and 50 phr or between 40 and 50 phr. For other light colors, other than white, other pigments may be added, either with or without the $TiO_2$, to the rubber composition as known to those having ordinary skill in the art. Thus, the present invention is not limited only to white decorative features but also includes other light-colored (not black) decorative features such as red, green and so forth.

Tire sidewalls are especially vulnerable to ozone cracking because they are exposed to the elements. Typically antiozonants are added to sidewall compositions to protect them from such attack. Particular embodiments of the present invention incorporate a non-staining antiozonant, such antiozonants including phosphates, hindered phenols, hindered bisphenols and quinines. An example of a suitable antiozonant that is non-staining is the hindered bisphenol 4,4'-thiobis(6-t-butyl-m-cresol). Waxes are also useful for protecting the sidewall features from static ozone attack and may optionally be included in the rubber composition. Such antiozonants may be added, for example, at between 0.75 and 5 phr.

The rubber composition disclosed herein may be cured by either a peroxide curing system or a sulfur curing system as known to those having ordinary skill in the art. Particular embodiments are limited to sulfur curing systems, such systems including sulfur, sulfur donors, accelerators, ultra accelerators and zinc oxide as known to those having ordinary skill in the art. Particular embodiments include between 0.5 and 3 phr sulfur, between 0.5 and 1.25 of a sulfur donor such as an alkylphenol disulfide, between 3 and 10 phr of zinc oxide, between 0.5 and 1.5 of an ultra accelerator and between 0.5 and 2 of an accelerator.

The invention is further illustrated by the following examples, which are to be regarded only as illustrations and not delimitative of the invention in any way. The properties of the compositions disclosed in the examples were evaluated as described below.

Moduli of elongation (MPa) were measured at 10%, 100% and at 300% at a temperature of 23° C. based on ASTM Standard D412 on dumb bell test pieces. These measurements are secant moduli in MPa, based on the original cross section of the test piece.

Hysteresis losses (HL) were measured in percent by rebound at 60° C. at the sixth impact in accordance with the following equation:

$$HL(\%) = 100(W_0 - W_1)/W_1,$$

where $W_0$ is the energy supplied and $W_1$ is the energy restored.

The elongation property was measured as elongation at break (%) and the corresponding elongation stress (MPa), which is measured at 23° C. based on ASTM Standard D412 using dumbbell test pieces.

The Mooney viscosity ML (1+4) at 100° C. was measured in accordance with Standard ASTM D 1646 of 1999.

The dynamic Tg, ° C. is determined by using a double shear dynamic modulus test specimen in a dynamic mechanical analysis (DMA) type machine. The test specimen is cooled to a frozen state and continuously solicited at a constant stress level as temperature is increased to ambient or beyond. The temperature at the maximum tangent delta is reported as the dynamic Tg of the specimen.

Static ozone testing for surface cracking is evaluated using a test closely related to the ASTM 1149-99 Standard Test Method for Rubber Deterioration entitled Surface ozone cracking in a chamber. The testing utilized in the examples that follow differs in the construction of the sample holder, which was a rod rather than a wooden block holder as required under the ASTM test method. Rectangular samples are cut with a die then folded in half and stapled such that the curvature of the loop has a maximum local strain of 18%.

These samples are hung on a rod for 2-5 days under ambient conditions before being placed in an ozone chamber. The ozone chamber conditions are set at 50 parts per hundred million ozone (pphm) and a temperature of 40° C. for three weeks. The samples are evaluated for cracks every week for up to nine months. The samples are evaluated using the Rubber Deterioration Test Grades that consists of three numbers. The first number indicates the number of cracks in the sample, the second rates the width of the cracks and the third number is the depth of the crack. Zero indicates that no cracks are observed. Dynamic Ozone Dynamic ozone properties are measured using uncured rubber that is sheeted to a specified thickness and cut into plaques which are then cured in a plate press at 150° C. for a time based on the rheology of the sample. After curing, test specimens are cut from the plaques and placed into an OREC-type oven having an ozone concentration of 50 pphm and a temperature of 40° C. The samples are flexed at 25% strain and 1 Hz for a specified time, removed from the oven, and observed for cracks. A numerical rating is assigned and is based on the number and size of the cracks.

Stain migration is determined by using composite samples prepared by curing 5 mm of a staining compound with 5 mm of the test compound. The resulting composite is then exposed to various aging conditions (up to 28 days at 77° C.) in order to promote migration of the staining material through the whitewall. At the end of the aging period, the composite sample is uniformly sliced, and each sample quantitatively analyzed by HPLC for the presence of the staining material. A plot of the staining material concentration as a function of distance graphically displays the migration rate across the interface. A numerical representation of the difference in migration rate can also be determined by comparing the average concentration of the staining material in the first 2.5 mm of the white compound.

EXAMPLE 1

Rubber formulations according to particular embodiments of the present invention were prepared, an example of which is shown in Table 1 along with a witness formulation. The materials and their amounts used in each formulation are shown in Table 1. The amounts are expressed in parts by weight per 100 parts of the elastomer. The witness formulation was prepared without the addition of an EPDM product or a paraffinic process oil.

TABLE 1

Formulations and Physical Properties

|  | Formulation 1 | Formulation 2 |
| --- | --- | --- |
| Formulations (phr) | | |
| Natural Rubber | 30 | 20 |
| Halogenated Butyl Rubber | 70 | 70 |
| EPDM | 0 | 10 |
| White Clay | 32.5 | 42.5 |
| Talc | 34 | 44 |
| TiO2 | 35 | 45 |
| Paraffinic Oil | 0 | 20 |
| Blue Pigment | 0.5 | 0.5 |
| Antidegradant Package | 2.75 | 2.75 |
| Curing Package | 10.31 | 10.86 |
| Processing Aids | 10 | 0 |
| Physical Properties | | |
| Mooney Viscosity, ML (1 + 4) at 100° C. | 36 | 34 |
| Scorch at 130 C. | 9.2 | 7.1 |
| TC90 @ 150 C. | 26 | 31 |
| Dynamic Tg, ° C. | −16 | −34 |
| MA10, MPa | 3.5 | 2.9 |
| M 100, MPa | 1.64 | 1.57 |
| MA300, MPa | 0.94 | 0.88 |
| Elongation at Break, % | 633 | 617 |
| Force at Break, MPa | 13.1 | 8.8 |
| Hysteresis Loss, % | 25.6 | 23.5 |
| Dynamic Ozone | No cracks in 9 months | No cracks in 9 months |
| Stain Migration, index* | 100 | 114 |

*Higher is more resistant to migration

Two stages were used to prepare the rubber compositions. First, the elastomers, fillers, oil, and chemicals including antioxidants were added to a plane shear internal mixer (a Banbury type having an approximate volume of 8 liters) in an amount as shown in Table 1. These materials were then mixed at a rotor speed of 65 RPM. The mixing was continued until the temperature reached 150° C. at which time the mixture was dropped and allowed to cool to about 30° C.

In the second stage, the cooled mixture was transferred back to the internal mixer, vulcanizing agents were added, and mixing was continued to 95° C. to insure good dispersion of the vulcanizing agents. The finished mix was then further processed according to the type specimen required for specific testing. For uncured properties, Mooney viscosity, scorch at 130° C. and TC90 at 150° C. were measured and the results are shown in Table 1. For cured properties, the resulting mix was rolled into sheets approximately 3 mm thick using a mill operated at 90° C. and 12.5 rpm and afterward cured in a plate press for 60 minutes at 150° C. The cured sheets were then cut into test pieces as needed for testing according to the test methods described above. The results are shown in Table 1 as the physical properties of the formulations.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description of particular embodiments is provided for the purpose of illustration only and should not be construed in a limiting sense, i.e., to only one or more of the particular embodiments described. Only the language of the following claims should limit the scope of this invention.

What is claimed is:

1. A tire comprising a sidewall surface feature, the sidewall surface feature being based upon a rubber composition, the rubber composition comprising:

between 15 and 25 parts by weight per 100 parts by weight of rubber (phr) of a highly unsaturated diene elastomer, wherein the highly unsaturated diene elastomer is an elastomer comprising a content of units of diene origin greater than 50 mol. %;

between 60 and 80 phr of a butyl rubber;

between 5 and 15 phr of an EPDM elastomer characterized as having an ethylene content of between 65 wt. % and 75 wt. % as measured by ASTM D 3900-95, not including diene, and a Mooney viscosity ML(1+4) at 125° C. of between 60 and 80;

between 5 and 25 phr of a paraffinic processing oil; and a non-black filler.

2. The tire of claim 1, wherein the highly unsaturated diene elastomer is natural rubber.

3. The tire of claim 1, wherein the highly unsaturated diene elastomer is selected from natural rubber, synthetic polyisoprene rubber or combinations thereof.

4. The tire of claim 1, wherein the highly unsaturated diene elastomer is limited in quantity to between 15 and 21 phr.

5. The tire of claim 4, wherein the highly unsaturated diene elastomer is natural rubber.

6. The tire of claim 1, wherein the butyl rubber is a halogenated butyl rubber.

7. The tire of claim 6, wherein the butyl rubber is a chlorobutyl rubber.

8. The tire of claim 1, wherein the butyl rubber is characterized as having a Mooney viscosity ML (1+8) at 125° C. of between 45 and 55.

9. The tire of claim 1, wherein the EPDM is characterized as having an ethylidene norbornene content of 0.9 and 6 wt. % as measured by ASTM D 6047.

10. The tire of claim 1, wherein the rubber composition does not include a staining antidegradant compound.

11. The tire of claim 1, wherein the paraffinic processing oil is characterized as having a dynamic glass transition temperature of less than −75° C.

12. The tire of claim 1, wherein the non-black filler is selected from bright clay, silica, talc, carbonates or combinations thereof.

13. The tire of claim 12, wherein the non-black filler is between 25 and 100 phr of high bright clay.

14. The tire of claim 12, wherein the non-black filler is between 25 and 100 phr of talc.

15. The tire of claim 1, wherein the rubber composition further comprises:
   titanium dioxide.

16. The tire of claim 1, wherein the paraffinic oil is between 10 phr and 20 phr.

17. The tire of claim 1, wherein the sidewall surface feature is selected from a raised lettering on the sidewall, a stripe around the sidewall or combinations thereof.

* * * * *